(12) United States Patent
Østmo et al.

(10) Patent No.: US 12,390,852 B2
(45) Date of Patent: Aug. 19, 2025

(54) METHOD AND APPARATUS FOR PRODUCTION OF A MULTIPHASE ELECTROMAGNETIC MAT FOR FORMING CURRENT CARRYING COMPONENTS OF A POWER CONVERSION SYSTEM

(71) Applicant: ALVA Industries AS, Trondheim (NO)

(72) Inventors: Oddvin Agnalt Østmo, Trondheim (NO); Halvard Berge, Trondheim (NO); Jørgen Selnes, Trondheim (NO)

(73) Assignee: Alva Industries AS, Trondheim (NO)

( * ) Notice: Subject to any disclaimer, the term of this patent is extended or adjusted under 35 U.S.C. 154(b) by 379 days.

(21) Appl. No.: 17/922,512

(22) PCT Filed: May 7, 2021

(86) PCT No.: PCT/NO2021/050117
§ 371 (c)(1),
(2) Date: Oct. 31, 2022

(87) PCT Pub. No.: WO2021/225453
PCT Pub. Date: Nov. 11, 2021

(65) Prior Publication Data
US 2023/0166320 A1 Jun. 1, 2023

(30) Foreign Application Priority Data
May 8, 2020 (NO) .................................. 20200543

(51) Int. Cl.
*H01F 7/06* (2006.01)
*B21F 27/02* (2006.01)
*H01F 41/064* (2016.01)

(52) U.S. Cl.
CPC ............ *B21F 27/02* (2013.01); *H01F 41/064* (2016.01)

(58) Field of Classification Search
CPC .......... H01F 41/064; H02K 3/04; H02K 3/47; A61K 40/4248; B21F 27/02
See application file for complete search history.

(56) References Cited

U.S. PATENT DOCUMENTS

| 4,151,964 | A | 5/1979 | Kaufmann et al. |
| 4,320,319 | A | 3/1982 | Takahashi |
| | | (Continued) | |

FOREIGN PATENT DOCUMENTS

| EP | 2710708 B1 | 8/2015 |
| GB | 2048729 A | 5/1979 |
| | (Continued) | |

OTHER PUBLICATIONS

International Search Report and Written Opinion dated Jul. 29, 2021 for International Patent Application No. PCT/NO2021/050117.

*Primary Examiner* — Paul D Kim
(74) *Attorney, Agent, or Firm* — Alix, Yale & Ristas, LLP

(57) ABSTRACT

A method and apparatus for production of a multiphase electromagnetic mat for forming current carrying components of a power conversion system, wherein the electromagnetic mat comprises structural fibre lengths divided into at least two groups and winding fibre lengths divided into several groups corresponding to the number of phases and the number of parallel conductors of one phase, wherein the winding fibre lengths are retained in position by the groups of structural fibre lengths.

20 Claims, 5 Drawing Sheets

(56) References Cited

U.S. PATENT DOCUMENTS

| | | | | |
|---|---|---|---|---|
| 4,504,098 | A | * | 3/1985 | Battarel .............. F16C 32/0465 |
| | | | | 310/90.5 |
| 4,644,209 | A | | 2/1987 | Nozawa |
| 4,691,746 | A | | 9/1987 | Sedgewick |
| 7,159,816 | B2 | | 1/2007 | Sweeney et al. |
| 11,646,645 | B2 | * | 5/2023 | Selnes .................... H02K 15/06 |
| | | | | 310/179 |
| 2004/0040142 | A1 | | 3/2004 | Hirota et al. |
| 2018/0212531 | A1 | * | 7/2018 | Hurwitz ................ H02M 7/217 |
| 2018/0294702 | A1 | | 10/2018 | Luttge |
| 2020/0244149 | A1 | | 7/2020 | Selnes |
| 2023/0208256 | A1 | * | 6/2023 | Matveev .................. H02K 9/00 |
| | | | | 310/68 D |

FOREIGN PATENT DOCUMENTS

| | | | |
|---|---|---|---|
| JP | 54114709 | A | 9/1979 |
| JP | 5518875 | A | 2/1980 |
| JP | 583550 | A | 1/1983 |
| JP | 58204751 | A | 11/1983 |
| JP | 09271158 | A | 10/1997 |

* cited by examiner

METHOD AND APPARATUS FOR PRODUCTION OF A MULTIPHASE ELECTROMAGNETIC MAT FOR FORMING CURRENT CARRYING COMPONENTS OF A POWER CONVERSION SYSTEM

BACKGROUND

The disclosed embodiments relate to a method for production of a multiphase electromagnetic mat for forming current carrying components of a power conversion system, and further to an apparatus for production of a multiphase electromagnetic mat for forming current carrying components of a power conversion system.

Multiphase electromagnetic mats can be used in numerous power conversion applications, such as rotary, linear and planar electric machines, transformers, heaters, chargers etc. The role of the mat is carrying the electric currents and creating electromagnetic field interacting with other components of the power conversion system.

Electric machines are the large application area for the electromagnetic mats since there exist families of electric machines, so-called slotless and ironless machines, wherein the stator or rotor components can comprise partly or entirely the electromagnetic mats, shaped to form a cylinder in rotary machines or left flat in linear or planar machines. Such components often have the mats moulded in some sort of a resin to form a composite component. In slotless electric machines the composite component is usually attached to the ferromagnetic core, while in ironless machines, also called coreless or air-cored machines, the mat moulded in resin often represents the separate composite component, such as the stator or the rotor.

The typical method of production of a winding of ironless or slotless machines is winding the conductors on some sort of form/mandrel. The form can comprise the ferromagnetic core of the electric machine or just the temporary form, which later can be removed.

For example, U.S. Pat. No. 4,691,746A discloses a method for production of a flat stator of an axial-flux rotary machine, comprising winding of the conductors on a disk-shaped form, and in CN1868010A a toroidal winding of a slotless machine is created by winding of the conductors on the toroidal core, and in CN103620916A and U.S. Pat. No. 4,644,209A are presented methods of winding on a short cylinder.

Numerous patent applications, such as U.S. Pat. Nos. 4,320,319A, 4,151,964A, JPS58204751A, JPS583550A, GB2048729A, JPS54114709A and JPS5518875A, disclose methods of winding conductors on cylindrical forms of elongated shape. The winding patterns resulting from these methods are characterized by having the conductors wound at an angle to the axis of the cylinder. The windings further have more than one layer.

All the methods are partly or entirely automated, so in many of the publications there is presented the corresponding machinery.

Just a few publications, such as JPH09271158A and WO2019074375A1, describe electromagnetic mats for electric machines as flat sheets. It is supposed that the mats are first made as flat sheets, where each sheet consists of windings, and can be divided into separate electromagnetic mats—or segments, and where the separate segments can then be shaped to form the stator or the rotor of an electric machine. Reference is made to the attached FIG. 1, which discloses a structure of electromagnetic mats formed by the principles of JPH09271158A. JPH09271158A fails to disclose a method for production of multiple continuous windings arranged in a pattern so that the electromagnetic mat can be used in multi-phase electric machines without the need for additional steps of cutting and reconnecting windings, which result in expensive and suboptimal products.

From US 2018294702 A1 is known a mechanism and method for introducing a wave winding from a prefabricated wave winding mat into stator sheet metal packet grooves. Disclosed is a mechanism for introducing a wave winding from a prefabricated wave winding mat into a rotor- or stator body having a receiving device for receiving and holding the rotor- or stator body, and a feed device that feeds the wave winding mat to the receiving device. The receiving device further has an introduction device that can isolate the windings of the winding mat and introduce the same in the depth direction of the grooves into the rotor or stator body.

WO2019074375A1, in the name of the applicant, describes both the structure of the electromagnetic mat and methods of production of the electromagnetic mat, as well as discloses a machine for production of the electromagnetic mat. In e.g. FIG. 16a-c in WO2019074375A1 are disclosed production of an electromagnetic mat by means of twinning. Reference is made to the attached FIG. 2 showing the machine of WO2019074375A1, wherein the machine comprises a circular member (90 in FIG. 2) rotatable around the electromagnetic mat (FIG. 2). Twinning does not allow production of single layer mats, moreover, it brings the problem of fixing the winding fibres (30 in FIG. 2) to the structural fibres (20 in FIG. 2). Accordingly, WO2019074375A1 fails to disclose a machinery for the production of single layer mats.

Prior art fails to disclose methods for production of electromagnetic mats with the conductors aligned perpendicular to the length of the electromagnetic mat.

The prior art solutions fail to disclose methods for production of electromagnetic mats suitable for making single layer windings.

Prior art fails to disclose methods for continuous production of electromagnetic mats with continuous windings of multiple phases or multiple bunches of conductors.

It is further a disadvantage of prior art solutions that they fail to disclose scalable and flexible/adjustable production methods, customized for different areas of use.

Prior art further fails to disclose an apparatus realizing a method for production of electromagnetic mats with the conductors aligned perpendicularly to the length of the electromagnetic mat and with continuous non-cut windings.

Prior art fails to disclose production methods that meet the requirements of scalable and flexible production of ironless and slotless components while also achieving high conductor fill factor.

Low weight and compactness of the current carrying components is crucial for performance of the power conversion systems. The ways to achieve low weight and compactness include providing high conductor fill factor within the electromagnetic mat and having the direction of the conductors perpendicular to the direction of motion of the main magnetic field in the power conversion system in order to maximize the electromagnetic force.

Low cost is important for acceptance of the power conversion systems on the market. Therefore, fully automated, flexible, adjustable production methods and the corresponding apparatus are of primary importance.

Today, automatic winding equipment is very expensive and customized for the types of machines described in the mentioned prior art. There is accordingly a need for a new method and apparatus.

Customized products offer higher performance but are associated with more costly and cumbersome methods, due to expensive re-tooling etc. A high flexibility and scalable production method would allow high volume production of low-cost, customized products.

SUMMARY

Provided herein is a method and apparatus for production of multiphase electromagnetic mats partly or entirely solving the above-mentioned drawbacks of prior art.

Provided herein is a method and apparatus for production of multiphase electromagnetic mats, which in a simple manner can be tailored as regards design and properties of the electrical machine.

Also provided herein is a method and apparatus for production of multiphase electromagnetic mats resulting in lower production costs, both for mass production and low volume production of customized electromagnetic mats.

Also provided herein is a method and apparatus for production of multiphase electromagnetic mats in an automatic, scalable and flexible manner.

Also provided herein is a method and apparatus for production of multiphase electromagnetic mats for production of stator or rotor for electrical machines, formed by a multiphase electromagnetic mat that can be rolled up or folded to form a stator or rotor component, which can be used in rotary or linear or planar electrical machines.

The multiphase electromagnetic mat according to the disclosed embodiments are made of structural fibres arranged mainly along the length of the electromagnetic mat and winding fibres crossing the structural fibres and arranged mainly in transversal direction to the length of the electromagnetic mat, wherein the structural fibres retain the winding fibres in place.

Often, the beginning and/or the end of the electromagnetic mat can contain parts consisting of other kinds of fibres than winding fibre (so-called auxiliary fibres). Such parts can be used for example for connection of the ends of the electromagnetic mat into a circular component forming, e.g., a stator of an electric machine.

Special equipment, herein referred to as "apparatus", is used for realization of the method for production of the electromagnetic mat. The intention of the apparatus is to sort the winding fibres with the purpose of maintaining a continuous winding of the multiple winding fibres in the electromagnetic mat into prescribed pattern(s) in one continuous process.

Preferred embodiments of the disclosed apparatus comprise the following components:
  a number of storages containing the winding fibres or auxiliary fibres located on each side of the electromagnetic mat to be produced, wherein the storages can come in many shapes, e.g. rectangular, circular, etc.,
  at least two movable magazines accommodating the storages by means of holders integrated into or on the movable magazines, wherein at least one movable magazine is located at each side of the electromagnetic mat to be produced, seen in the same plane as the electromagnetic mat, wherein the movable magazines can come in many shapes (e.g. rectangular, circular, linear, ring, etc.),
  a transfer mechanism which is used to transfer/transport the storages with the winding fibres from one storage in one movable magazine on one side of the electromagnetic mat to be produced to another storage in another movable magazine located on the other side of the electromagnetic mat to be produced.

It should be understood that a magazine can have a stationary part, such as for example a shaft or a frame and a movable part or parts, so by saying "movable magazine" it is meant that the magazine has movable elements and it is not meant the whole magazine should move.

According to one embodiment of the apparatus, the transfer mechanism comprise means for fastening and releasing the storages to and from the holders on the movable magazine.

The magazines can be made removable or replaceable or exchangeable for reloading of the winding and the auxiliary fibres in the storages. The storages can be re-wounded directly while in the apparatus or exchanged by fully or partly wounded storages. The type of storage may change during operation.

The method for production of an electromagnetic mat comprises having the structural fibre lengths divided into at least two groups $G1, G2, \ldots, Gn$, wherein n is an integer number larger than 1, namely first, second, ..., n groups.

The method further comprises having the winding fibre lengths divided into several groups $W1, W2, \ldots, Wn$ corresponding to the number of phases and the number of parallel branches of each phase, and having the winding fibre lengths wound on a number of storages accommodated in at least two movable magazines, wherein at least one movable magazine is located at each side of the electromagnetic mat to be produced, seen in the plane of the electromagnetic mat.

In the disclosed method, the winding fibres are divided into at least two groups $W1, W2, \ldots, Wtotal$, where the total number Wtotal of winding fibres corresponds to the total number of parallel branches in all phases.

According to the disclosed method, each of the winding fibre groups $W1, W2, \ldots, Wn$ is wound on a dedicated storage. The storage should contain a length of winding fibre enough to produce an electromagnetic mat of a given design, or parts of an electromagnetic mat or several electromagnetic mats.

The storages are accommodated in the movable magazines, which are movable to position the dedicated storage into the position most suitable for insertion of the winding fibre, which is the next one to become part of the electromagnetic mat.

According to a further embodiment of the method, it comprises holding the beginnings of the winding fibres in place on one side of the electromagnetic mat to be produced, so that the storage can be transferred to the other side of the electromagnetic mat and the winding fibres can be retained in place by the structural fibres, and the "normal process" can begin.

One cycle of the winding process according to the method comprises at least the following steps:
  moving the first group G1 of the structural fibre lengths in a first direction, substantially perpendicular to the plane of the electromagnetic mat to be produced and moving the second group G2 of the structural fibre lengths in an a second direction, the second direction being an opposite direction of the first direction, to have the structural fibre lengths of the two groups at a certain angle to the plane of the electromagnetic mat to be produced,
  inserting a selected number of winding fibre lengths into an opening formed between the first and second group of structural fibre lengths so that the winding fibre lengths extend across the structural fibre lengths, retaining the winding fibre lengths in position by either moving the first group G1 of the structural fibre lengths in the second direction and moving the second group G2 of the structural fibre lengths in the first direction so that the groups G1 and G2 of structural fibre lengths swap positions at least once, or by using at least one other group G3, . . . , Gn of structural fibre lengths in a similar manner, enabling the forming of various patterns of structural fibres and winding fibre overlaps.

The method can further comprise the step of pushing the inserted winding fibre lengths towards the beginning of the electromagnetic mat to be produced.

The selected number of winding fibre lengths can comprise one group (e.g. W1) or several groups.

While inserting the selected number of winding fibre lengths into the opening formed between the at least two groups of structural fibre lengths, the at least one storage the winding fibre lengths belongs to is transferred from a movable magazine on one side of electromagnetic mat to be produced to another movable magazine on the other side of the electromagnetic mat to be produced.

According to a further embodiment, it comprises controlling and adjustment of the tension of the inserted winding fibre lengths.

According to a further embodiment of the method, it comprises retaining the winding fibre lengths in a position by changing direction of the groups of structural fibre lengths at least two times in a rotational motion and thus forming a twist of the structural fibre lengths.

The method further comprises, after the first cycle is completed, performing a next cycle of the winding process, namely insertion of a new selected number of winding fibre lengths (e.g. W2) into the electromagnetic mat to be produced (between groups G1 and G2 of structural fibre lengths or between other combinations of the groups of structural fibre lengths). The cycles continue until winding fibres from all the groups of winding fibres W1, W2, . . . Wtotal have been added to the structure of the electromagnetic mat to be produced.

The method further comprises predefined motion of the movable magazines in order to have the storages of the winding fibre group, which is going to be inserted next in the optimal position relative to the opening formed between the two or more groups of the structural fibres.

The method further comprises, when the total number of winding fibres W1, W2, . . . Wtotal are inserted and retained in place in the electromagnetic mat, performing a new insertion sequence involving the mentioned groups in the same or a different order, so the process continues.

The direction of which the winding fibres are inserted (from one side of the electromagnetic mat to be produced to the other or in the opposite direction) is decided during the design process. This lays the foundation of the various winding patterns. It is natural, though, that once a winding is inserted from one side, it must be inserted from the opposite side the next time it is to be inserted.

When producing an electromagnetic sheet comprising several electromagnetic mats, the winding fibres W1, . . . , Wtotal, of a newly started electromagnetic mat will already have their "end wires" retained in place in the last formed electromagnetic mat. The "end wires" should be made long enough so that when cut, the divided winding fibre(s) can function as "end wires" for both the first and the last electromagnetic mat.

If the current carrying component for electric machine is made up of several layers, the electromagnetic mat of this component might have segments of varying lengths, while having the same winding pattern, as the circumference increase from layer to layer. The distance between the winding fibres should be made changeable so that it could increase when producing the segment for the layer of longer length. The increase in incremental steps should be possible to realize for multiple-layer structure of the current carrying component.

Between the segments forming the different layers the method comprises insertion of a buffer region to accommodate for the "jump" the electromagnetic mat has to make when transitioning from "Layer N" to "Layer N+1", wherein N is an integer number higher than 1. This gap can be formed by the apparatus, either by varying parameters of the apparatus at this instant, e.g. lowering tensile in structural fibres, or by inserting auxiliary fibres, e.g. winding fibres with non-electromagnetic properties, or by making the incremental step as described above.

An electromagnetic sheet may be made of several electromagnetic mats of different design (different winding pattern) produced continuously one after another being connected in series. New winding fibres Wtotal+1, etc. may be added to the process to accommodate for more parallel windings (in some or more of the phases) or winding fibres might be removed for the same, but opposite, reason. This means that it is possible to have a continuous process of making electromagnetic mats of different designs without stopping production or restructuring/re-tooling the apparatus. According to a further embodiment, the winding fibres may be added to a storage if the storage can accommodate for multiple winding fibres, or new storages may be added or removed from the process. Storages not in use may be a part of the apparatus without being a part of the production.

When an electromagnetic sheet is completed, the winding fibres extending from the electromagnetic mat to the storages must be cut, the storages must be re-wound (if they do not contain enough winding fibre to restart the process of another electromagnetic sheet) or replaced, and the process repeats for a new identical or different design of electromagnetic mat. The electromagnetic sheet now contains one or more electromagnetic mats connected in series, which can be divided into individual electromagnetic mats, each of which can be shaped to form its designated electromagnetic component, e.g. cylindrical winding.

When the method is automated a software to accommodate for the sequencing of the storage transfer and order is becoming part of the mentioned method and apparatus. The software will enable flexible adjustable production of electromagnetic mats of different winding patterns.

BRIEF DESCRIPTION OF THE DRAWINGS

Exemplary embodiments of the present invention will below be described with references to the attached drawings, where.

DETAILED DESCRIPTION

Figure 1:
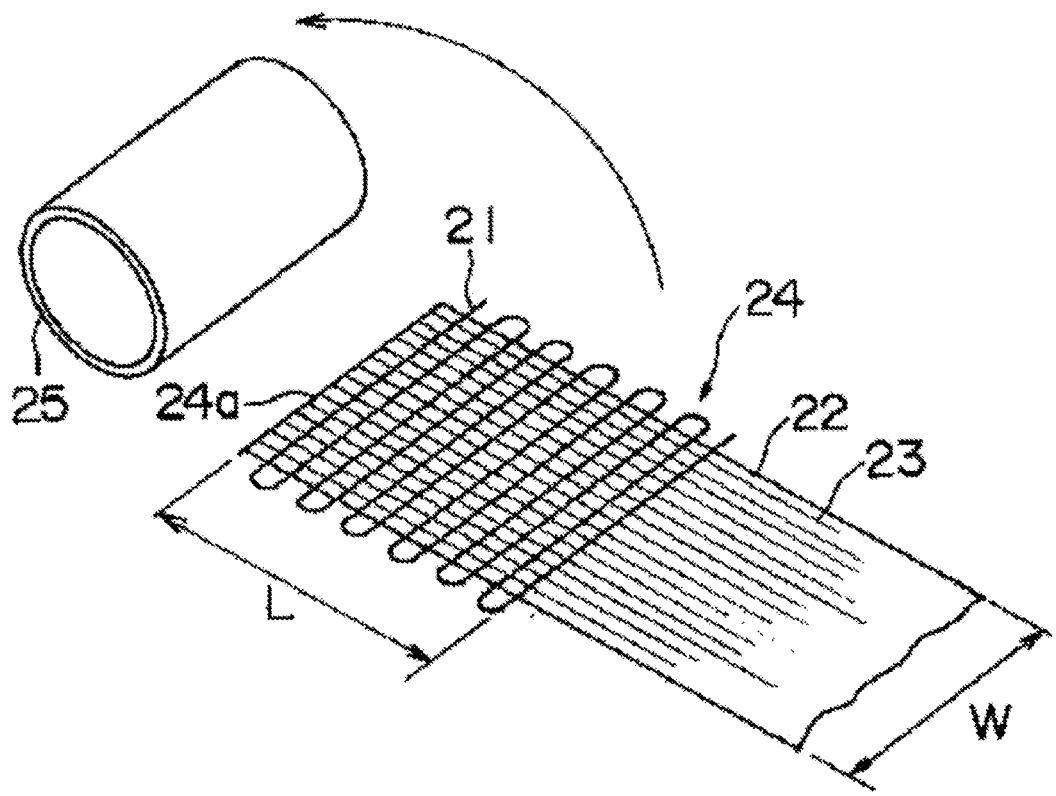
FIG. 1 is a principle drawing of a structure of an electromagnetic mat according to prior art.

Reference is now made to FIG. 1, which is a principle drawing of a structure of an electromagnetic mat according to prior art JPH09271158A. The conductor 21 is a single-phase winding. The production method is not disclosed.

Figure 2:
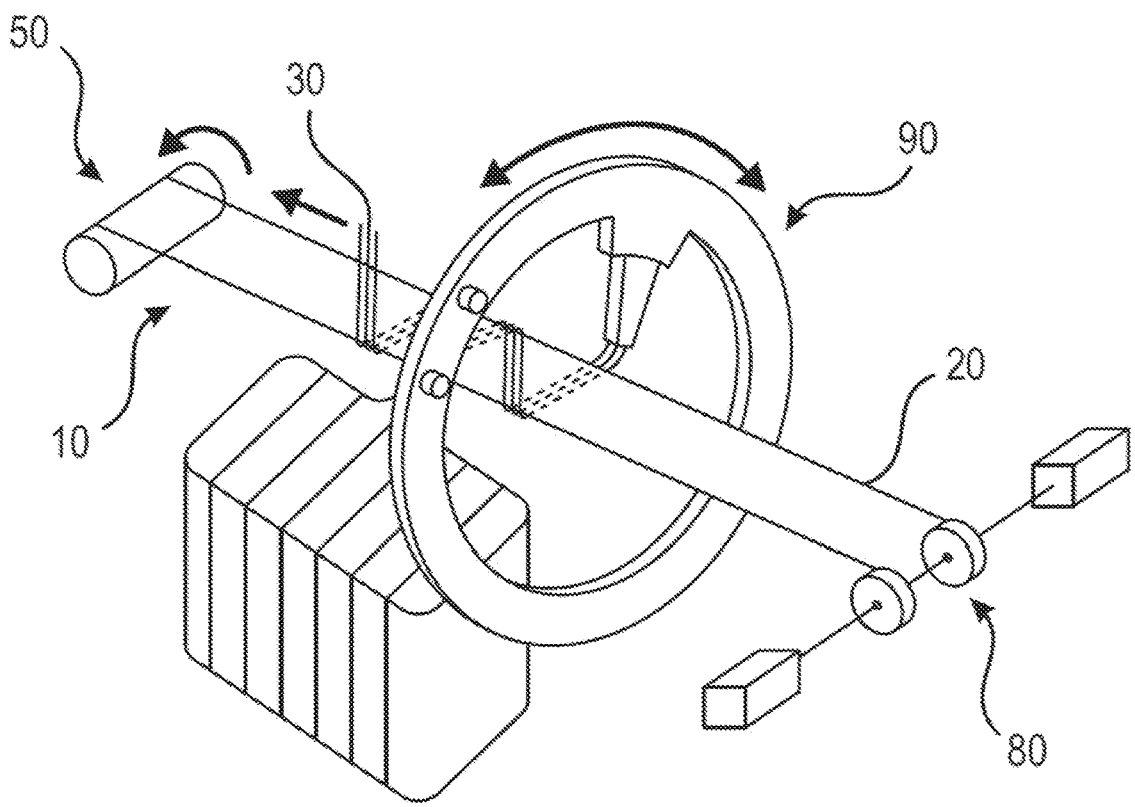
FIG. 2 is a principle drawing of a machine for production of an electromagnetic mat according to prior art.

Reference is now made to FIG. 2 which is a principle drawing of the machine for production of an electromagnetic mat according to prior art WO2019074375A1. The circular element 90 surrounding the electromagnetic mat can only be used for twinning as the method of making the winding.

Figure 3:
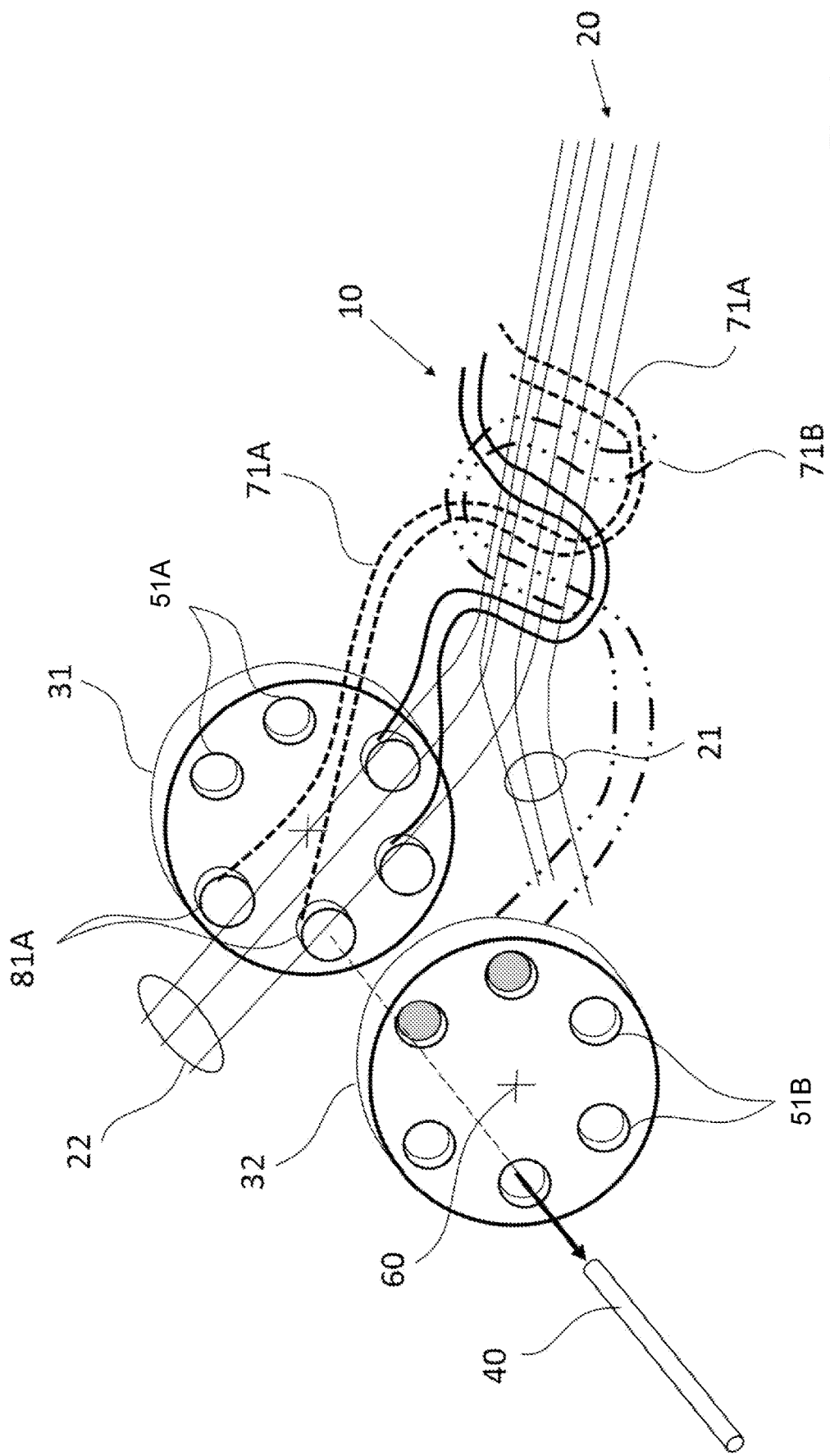
FIG. 3 is a principle drawing of key elements of an apparatus (winding machine) according to the disclosure, seen in 3D perspective.

Reference is now made to FIG. 3 which is a principle drawing of key components of an apparatus for production of an electromagnetic mat 10.

The electromagnetic mat 10 comprises structural fibre lengths 20; and a plurality of winding fibre lengths 70 (FIG. 4), 71A, 71B, wherein the winding fibre lengths are for forming a winding pattern.

The structural fibre lengths 20 are divided into two groups, namely first 21 and second 22 group. The winding fibre lengths are divided into several groups 71A, 71B corresponding to the number of phases and the number of parallel conductors of one phase. In this example, the number of groups is six. The winding fibre lengths are wound on a number of storages 81A, attachable to at least two movable magazines 31, 32, located on both sides of the electromagnetic mat 10 to be produced, seen in the plane of the electromagnetic mat. Number of storages 81A in this example is the same as number of the groups of winding fibre lengths. The movable magazines 31, 32 have holders 51A, 51B for the storages 81A. In this example, the number of holders 51A, 51B on each magazine 31, 32 is equal to the number of the groups 71A, 71B of the winding fibre 70 lengths and is six. The movable magazines 31, 32 in this example have the form of disks or cylinders rotatable around axis 60 of rotation.

The apparatus further comprises a transfer mechanism 40 for transfer of storages 81A from one magazine 31, 32 to the other. According to a further embodiment, the transfer mechanism 40 comprises means for fastening and releasing of the storages 81A to and from the movable magazines 31, 32.

Reference is now made to FIGS. 4A-4D showing the process of retaining a winding fibre 70 in a position by structural fibres 21, 22.

Figure 4A:
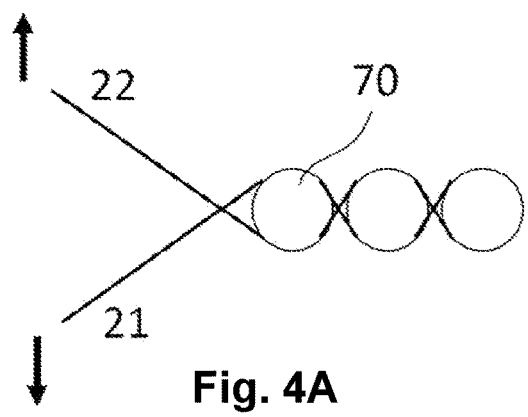
FIGS. 4A-4E show the process of insertion of the winding fibre lengths according to the disclosure.

FIG. 4A shows moving the first group of structural fibres 21 in one direction and the second group of structural fibres 22 in opposite direction, thus creating opening between the two groups.

Figure 4B:
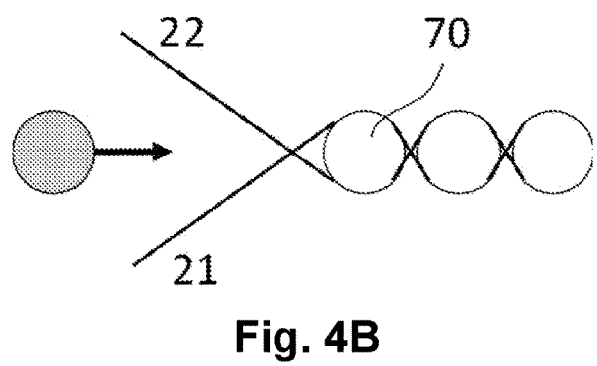

FIG. 4B shows adding a new winding fibre to the electromagnetic mat 10 by insertion of a new winding fibre into the opening between the two groups of structural fibres 21, 22.

Figure 4C:
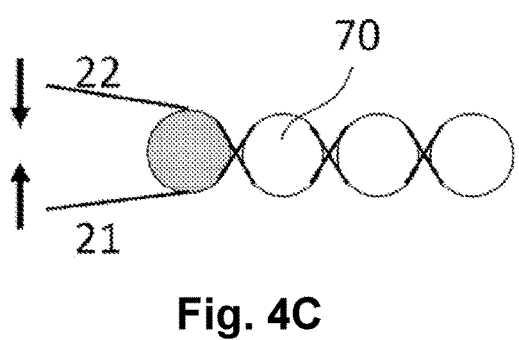

FIG. 4C shows the two groups of structural fibres 21, 22 swapping the direction of the motion.

Figure 4D:
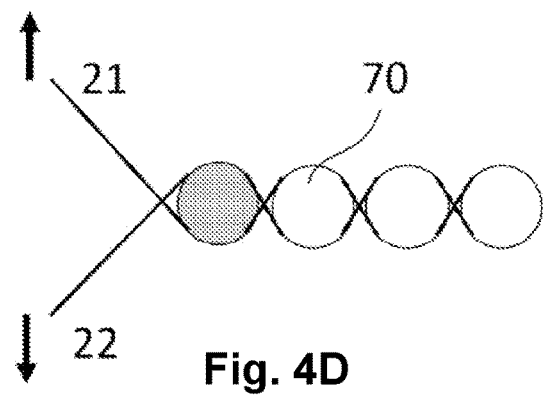

FIG. 4D shows the two groups of structural fibres 21, 22 retaining the winding fibre 70 in a position.

Figure 4E:
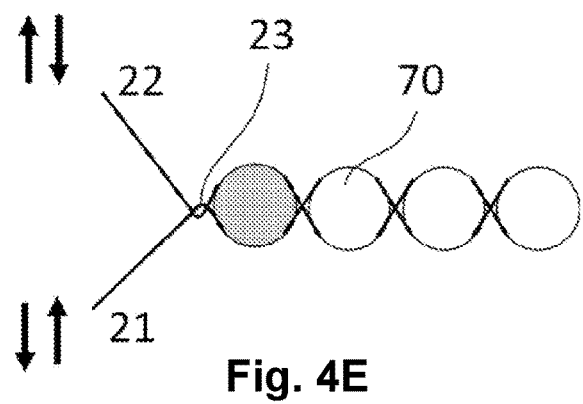

The FIGS. 4A-4D describe only one variant of a complete process of retaining. The process can however be more complex. FIG. 4E shows the two groups of structural fibres 21, 22 retaining the winding fibre 70 in a position by changing direction of the groups two times in different directions in a reciprocal manner, for example, a rotational motion, and thus forming a twist 23 of the structural fibres.

The rotational motion is, e.g., achieved by that means 85 for movement of the structural fibre lengths 20 is arranged for rotational motion.

Figure 5:
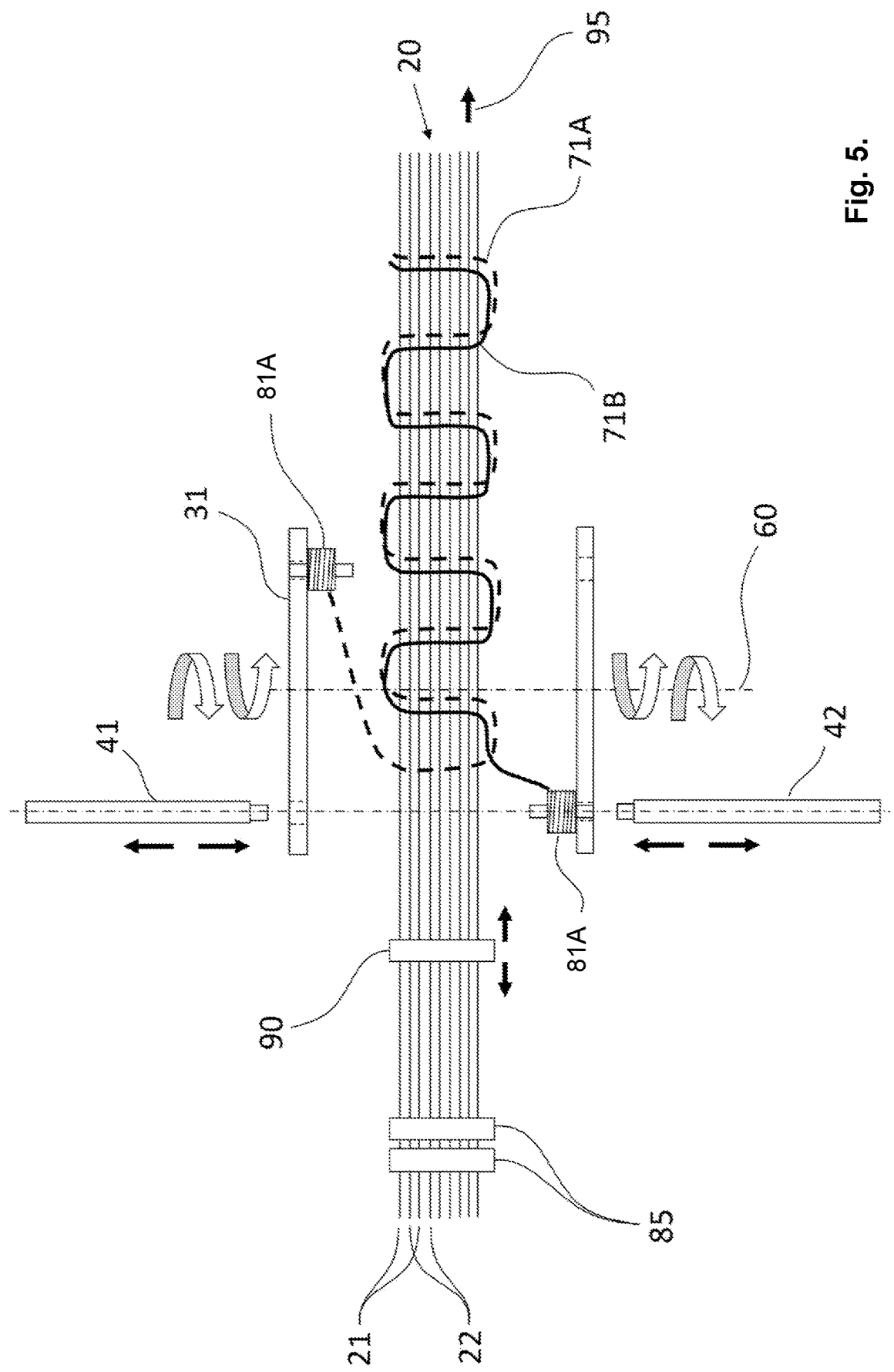
FIG. 5 is a principle drawing of the apparatus (winding machine), seen in a top view.

Reference is now made to FIG. 5 providing some more details of the process and the apparatus. The winding process includes at least the following steps:

using means 85 for moving the structural fibre lengths of the first group 21 in a first direction, substantially perpendicular to the plane of the electromagnetic mat 10 to be produced and moving the structural fibre lengths of the second group 22 in a second direction, the second direction being in opposite direction of the first direction, to have the structural fibre lengths of the two groups 21, 22 at a certain angle to the plane of the electromagnetic mat 10 to be produced, inserting the selected number of winding fibre lengths 70 into the opening formed by the structural fibre lengths of the first 21 and second 22 group so that the winding fibre lengths extend across the structural fibre lengths in transversal direction to the length of the electromagnetic mat 10, pushing the inserted winding fibre lengths towards the beginning of the electromagnetic mat 10, with the help of means 90 for pushing the winding fibre length, retaining the winding fibre lengths in position by moving the first group 21 of the structural fibre lengths in the second direction and moving the second group 22 of the structural fibre lengths in the first direction so that the groups swap positions.

The formed electromagnetic mat 10 is moving in the direction 95 away from the movable magazines 31, 32.

The means 90 for pushing the winding fibre length(s) can be turned to a certain angle in the transversal direction of the electromagnetic mat 10 to make a skew of the winding pattern.

While inserting the selected number of winding fibre lengths into the opening formed by the structural fibre lengths of the two groups 21, 22, the at least one storage 81A the winding fibre lengths belongs to is transferred from the magazine 31, 32 on one side of electromagnetic mat 10 to the magazine 31, 32 on the other side of the electromagnetic mat 10 with the help of transfer mechanism parts 41, 42, such as one or more actuators.

The winding process further comprises predefined motion of the magazines 31, 32 in order to have the storages 81A of the phase group (winding group) which is going to be inserted next in the position closest to the opening formed by the groups 21, 22 of structural fibre lengths, in the examples in FIGS. 4A-4E, shown as lifted and lowered positions. This can be achieved by rotation of the movable magazines 31, 32 around the axis 60 of rotation.

FIG. 5 is an example of how the components may look. For example, in some other possible embodiments the transfer mechanism does not have to be moving.

Reference is now made to FIGS. 6A-6D showing some examples of how the winding fibres can be combined and retained in a position by the structural fibres.

Figure 6A:
FIGS. 6A-6E show individual winding fibres and groups of winding fibres retained in a position by structural fibres.

FIG. 6A shows configuration where each phase has two winding fibres A, B, C, respectively, in a row, each retained individually in position by the groups 21, 22 of structural fibres.

Figure 6B:
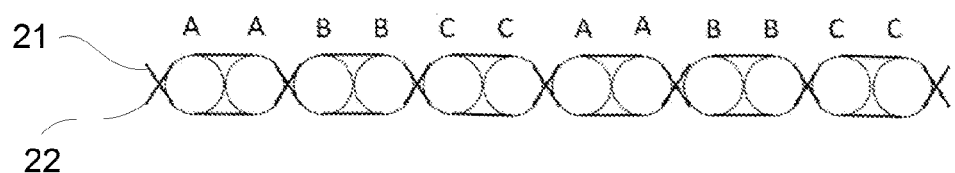

FIG. 6B shows configuration where each phase has two winding fibres A, B, C, respectively, in a row, retained in position together by the groups 21, 22 of structural fibres.

Figure 6C:
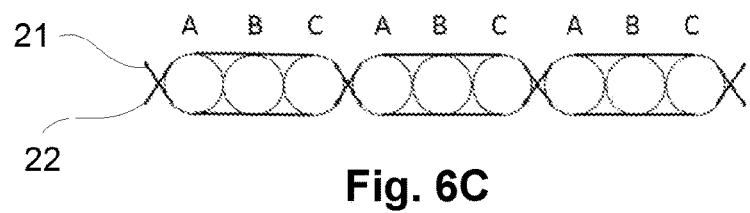

FIG. 6C shows configuration where three winding fibres A, B, C, respectively, of three different phases are retained in position together by the groups 21, 22 of structural fibres.

Figure 6D:
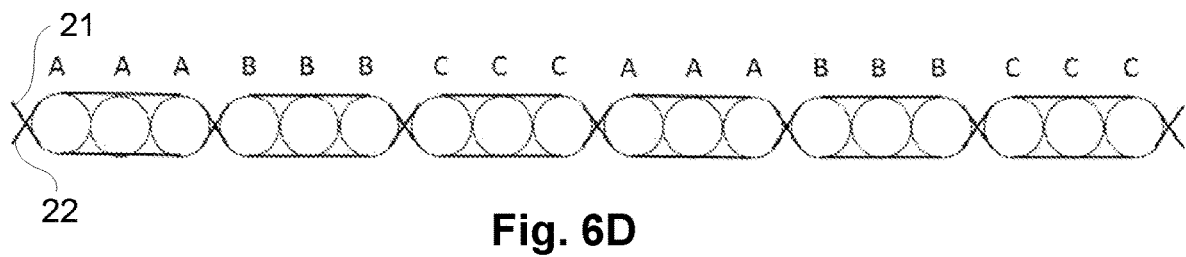

FIG. 6D shows six bunches/groups of three winding fibres A, B, C, respectively, each bunch belonging to the same phase.

Figure 6E:
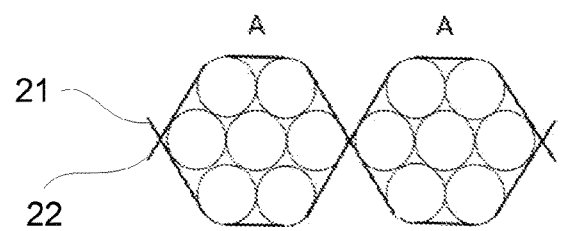

FIG. 6E shows two bunches of seven winding fibres A, B, C, respectively, each bunch belonging to the same phase.

The above described embodiments can be combined and modified to form other embodiments which are within the scope of the claims.

The disclosed embodiments are also applicable for production of the electromagnetic mat and simultaneously rolling it on a cylindrical form. In some embodiments, the cylindrical form can comprise a ferromagnetic core of an electric machine. The cylindrical form can have the same axis of rotation as the magazines or a different axis of rotation.

In a further modification, the apparatus can be placed in any position and at any angle in relation to the earth surface.

In a further modification, the magazines containing the winding fibres on each side of the electromagnetic mat can come in any shapes.

In a further modification, the motion of the magazine can be translatory.

In a further modification, the storages and holders for storages can come in any shapes.

In a further modification, the transfer mechanism can come in any configuration.

In a further modification, there are means for controlling width of the produced electromagnetic mat.

In a further modification, the means for pushing the winding fibre length can be turned to a certain angle in the transversal direction.

In a further modification, multiple layers of sheets S1, S2, etc. may be produced at the same time (where the sheets are parallel to each other but shifted a distance) in the direction perpendicular to the plane of the first sheet S1.

In a further modification, when winding multiple layers of sheets, winding fibres from one sheet could be introduced in other sheets in a process where the sheets are then combined to create a multilayer sheet.

LIST OF DESIGNATIONS

10—electromagnetic mat
20—structural fibres
21—first group of structural fibres
22—second group of structural fibres
23—twist
31—first magazine
32—second magazine
40—transfer mechanism
41—transfer mechanism part 1
42—transfer mechanism part 2
51A—holders for storage of group W1 on a first magazine
51B—holders for storage of group W2 on a second magazine
60—axis of rotation
70—winding fibres
71A—winding fibres of group W1
71B—winding fibres of group W2
81A—storages of group W1 on the first magazine
85—means for moving the structural fibre length
90—means for pushing the winding fibre length
95—direction of moving of the mat

The invention claimed is:

1. A method for production of a multiphase electromagnetic mat for forming current carrying components of a power conversion system, the electromagnetic mat having structural fiber lengths and a plurality of winding fiber lengths, wherein the winding fiber lengths form a winding fiber that is in a winding pattern for forming one or more windings of the power conversion system, and the winding fiber lengths are divided into several groups, comprising:
   dividing the structural fiber lengths into at least a first group and a second group;
   dividing the winding fiber lengths into the several groups corresponding to a number of phases and a number of parallel branches of each phase; and
   winding the winding fiber lengths on a number of storages accommodated in at least two movable magazines, at least one movable magazine of the at least two movable magazines being located at respective opposite sides of the electromagnetic mat being produced along a plane defined by the electromagnetic mat, wherein the winding further comprising:
   moving the first group of the structural fiber lengths in a first direction substantially perpendicular to the plane defined by the electromagnetic mat being produced;
   moving the second group of the structural fiber lengths in a second direction opposite from the first direction, to have the structural fiber lengths of the first and the second groups at a predetermined angle to the plane defined by the electromagnetic mat being produced;
   inserting a selected number of winding fiber lengths into an opening formed between the structural fiber lengths of the first group and the second group so that the winding fiber lengths inserted extend across the structural fiber lengths; and
   retaining the winding fiber lengths in a position by moving the first group and the second group of the structural fiber lengths so that the first and the second groups swap positions at least once, or by using at least one additional other group of the structural fiber lengths in a comparable manner, thereby forming various patterns of structural fiber lengths and winding fiber lengths overlaps.

2. The method according to claim 1, wherein retaining the winding fiber lengths in the position includes changing direction of the first group and the second group of structural fiber lengths at least two times in a rotational motion, thereby forming a twist of the structural fiber lengths.

3. The method according to claim 1, further comprising, during the inserting, transferring at least one of the storages and its respective winding fiber lengths from at least one movable magazine of the at least two movable magazines on one side of electromagnetic mat to another movable magazine of the at least two movable magazines on the other side of the electromagnetic mat.

4. The method according to claim 3, further comprising moving the at least two movable magazines in a predefined motion in order to have the storages of the winding fiber lengths which is going to be inserted next in a preferred position relative to the opening formed by the two groups of structural fiber lengths.

5. The method according to claim 2, further comprising moving the at least two movable magazines in a predefined motion in order to have the storages of the winding fiber lengths which is going to be inserted next in a preferred position relative to the opening formed by the first and second groups of structural fiber lengths.

6. The method according to claim 1, further comprising moving the at least two movable magazines in a predefined motion in order to have the storages of the winding fiber lengths, which is going to be inserted next, in a preferred position relative to the opening formed by the first and second groups of structural fiber lengths.

7. The method according to claim 1, further comprising pushing the selected number of winding fiber lengths towards a beginning of the electromagnetic mat after the inserting and before the retaining.

8. The method according to claim 1, further comprising winding the electromagnetic mat directly on a stator or rotor component of an electric machine.

9. The method according to claim 1, wherein the method is capable of enabling production of a variety of electromagnetic mats or a multiple of same electromagnetic mats in a continuous process.

10. The method according to claim 1, further comprising controlling and adjusting tension on the winding fiber lengths being inserted.

11. The method according to claim 1, further comprising producing parts of the electromagnetic mat with auxiliary fiber.

12. An apparatus for production of a multiphase electromagnetic mat for forming current carrying components of a power conversion system, the electromagnetic mat comprising structural fiber lengths and a plurality of winding fiber lengths, wherein the winding fiber lengths form a winding fiber that is in a winding pattern for forming one or more windings of the power conversion system, the apparatus comprising:
   storages to store several groups of the winding fiber lengths accommodated in at least two movable magazines by holders, at least one movable magazine of the at least two movable magazines being located at each side of the electromagnetic mat being produced along a plane defined by the electromagnetic mat;
   a moving unit configured to move the several groups of the structural fiber lengths in different directions in a reciprocal manner; and
   at least one transfer mechanism configured to transfer at the storages from at least one movable magazine of the at least two movable magazines on one side of the electromagnetic mat to at least one movable magazine of the at least two movable magazines on another side of the electromagnetic mat.

13. The apparatus according to claim 12, wherein the moving unit is configured for a rotational movement of the structural fiber lengths.

14. The apparatus according to claim 12, further comprising a control and adjustment device configured to control and adjust tension of the winding fiber lengths.

15. The apparatus according to claim 12, further comprising a synchronization device configured to synchronize at least motion of the at least two movable magazines and the moving unit.

16. The apparatus according to claim 12, further comprising a pushing device configured to push the winding fiber lengths towards a beginning of the electromagnetic mat.

17. The apparatus according to claim 12, wherein the holders comprise openings or recesses.

18. The apparatus according to claim 12, wherein the at least one transfer mechanism comprises one or more actuators.

19. The apparatus according to claim 12, wherein the at least one transfer mechanism comprises a fastening device configured to fasten and release the storages to and from the at least two movable magazines.

20. The apparatus according to claim 12, wherein the at least two movable magazines are removable and replaceable.

* * * * *